United States Patent [19]

Asaida

[11] Patent Number: 4,490,738
[45] Date of Patent: Dec. 25, 1984

[54] DIGITAL COLOR CAMERA

[75] Inventor: Takashi Asaida, Atsugi, Japan

[73] Assignee: Sony Corporation, Tokyo, Japan

[21] Appl. No.: 391,710

[22] Filed: Jun. 24, 1982

[30] Foreign Application Priority Data

Jun. 26, 1981 [JP] Japan .................................. 56-99867

[51] Int. Cl.$^3$ ............................................. H04N 9/09
[52] U.S. Cl. ........................................ 358/50; 358/41
[58] Field of Search ................................... 358/50, 41

[56] References Cited

U.S. PATENT DOCUMENTS

Re. 30,800  11/1981  Yamanaka ............................ 358/44
4,106,056   8/1978   Nagumo et al. ...................... 358/50

*Primary Examiner*—Richard Murray

*Attorney, Agent, or Firm*—Hill, Van Santen, Steadman & Simpson

[57] ABSTRACT

A digital color camera is disclosed, which includes a circuit for generating first, second and third digital color signals, each at a rate of $4f_{sc}$ (where $f_{sc}$ represents a color subcarrier frequency) from the outputs of first, second and third imagers. A circuit forms a digital luminance signal from the first, second and third digital color signals, and a circuit forms a dot-sequential color difference signal with the first and second digital color difference signals appearing alternately every 1 $4x_{sc}$ from the first, second and third digital color difference signals and a circuit passes a dot-sequential digital color difference signal through a digital filter so as to limit the band widths of the first and second digital color difference signals and the overall circuit provides improved color TV signals which are formed with simpler circuit means.

12 Claims, 37 Drawing Figures

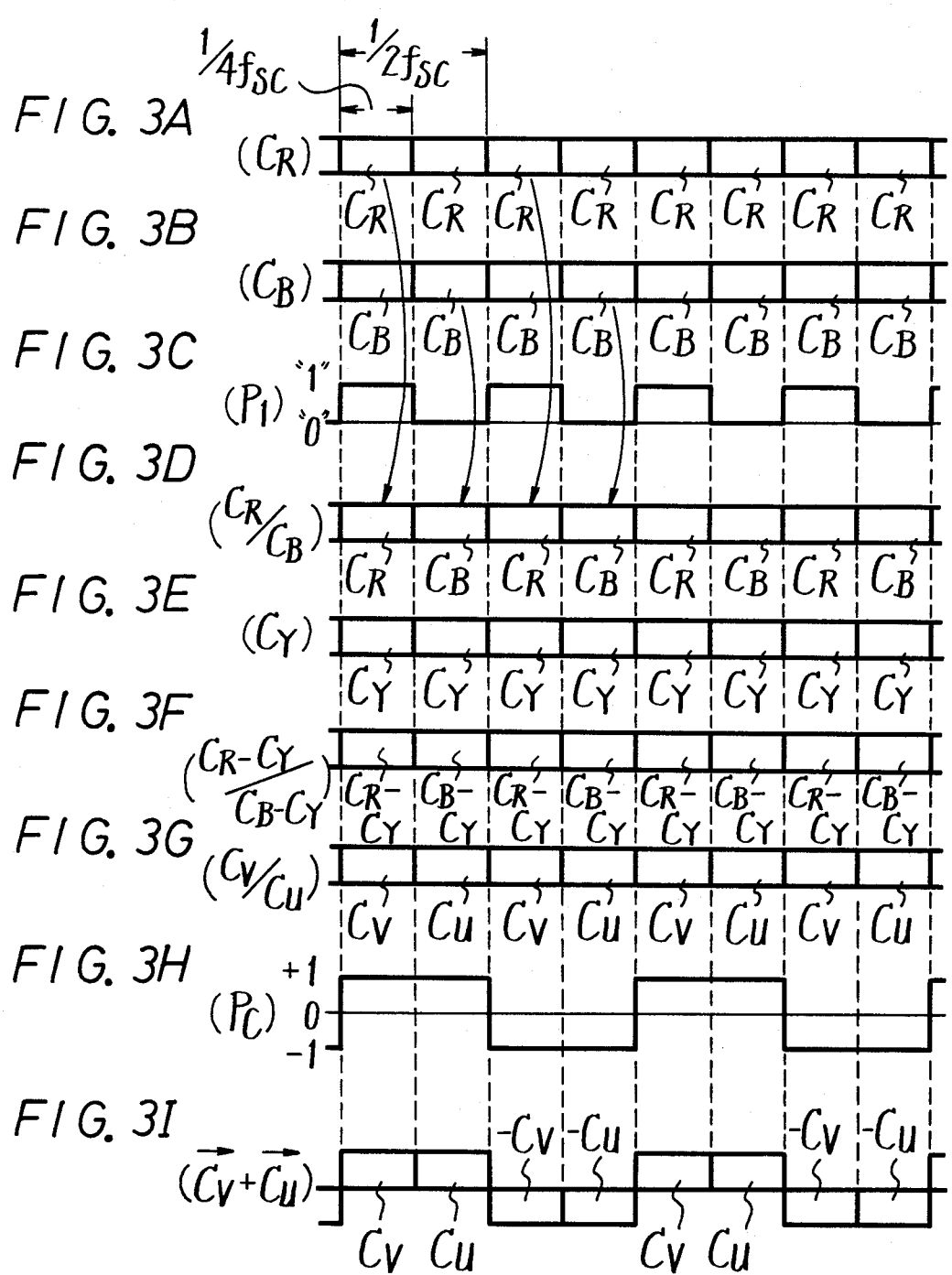

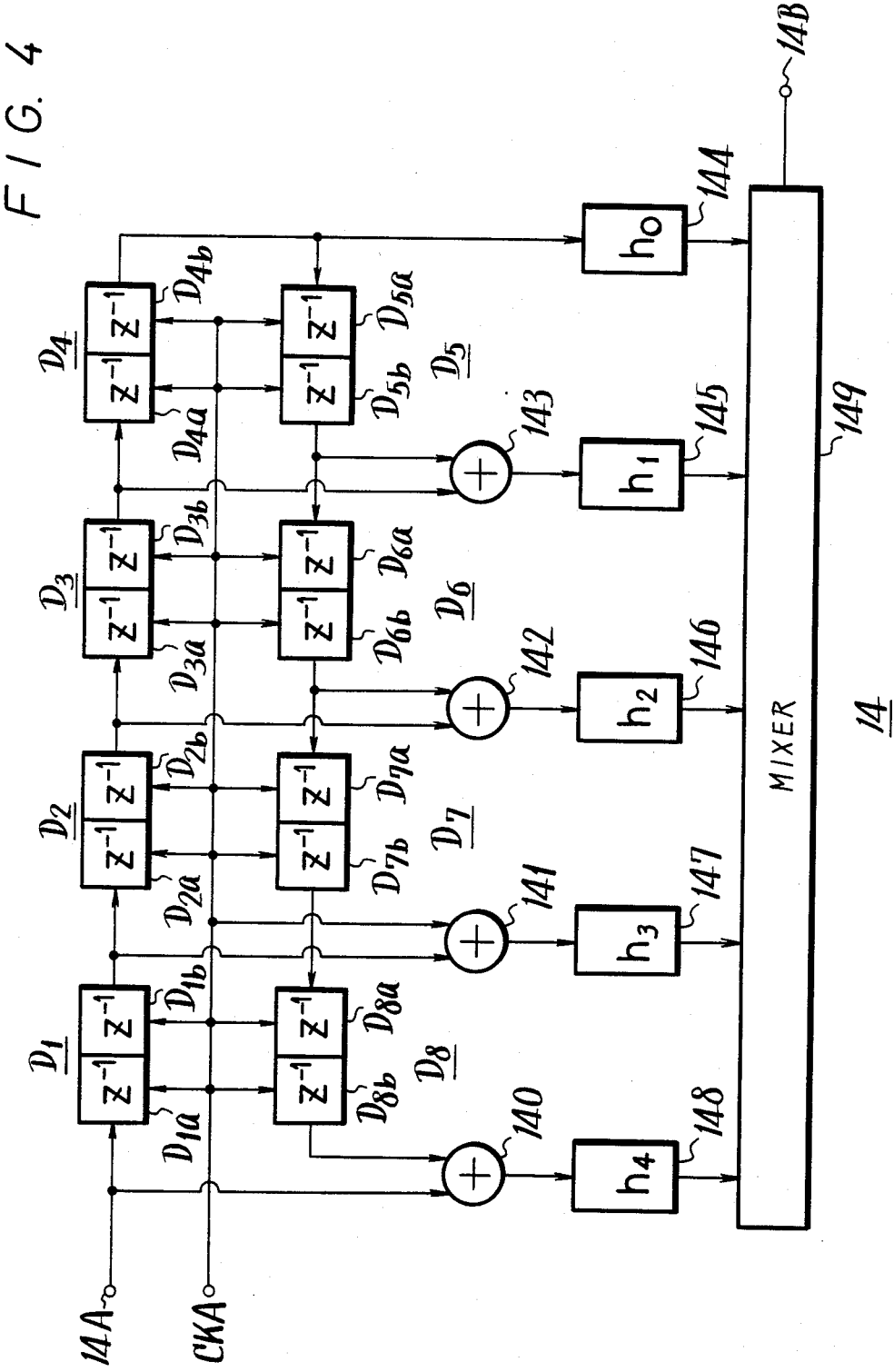

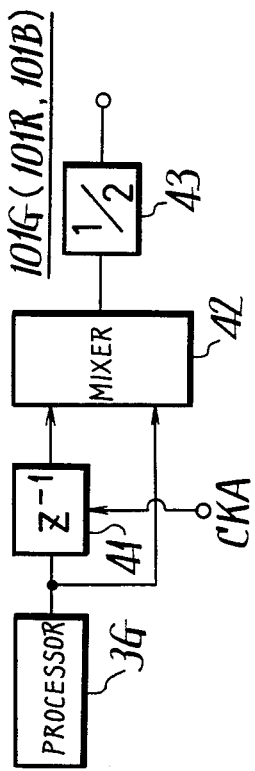
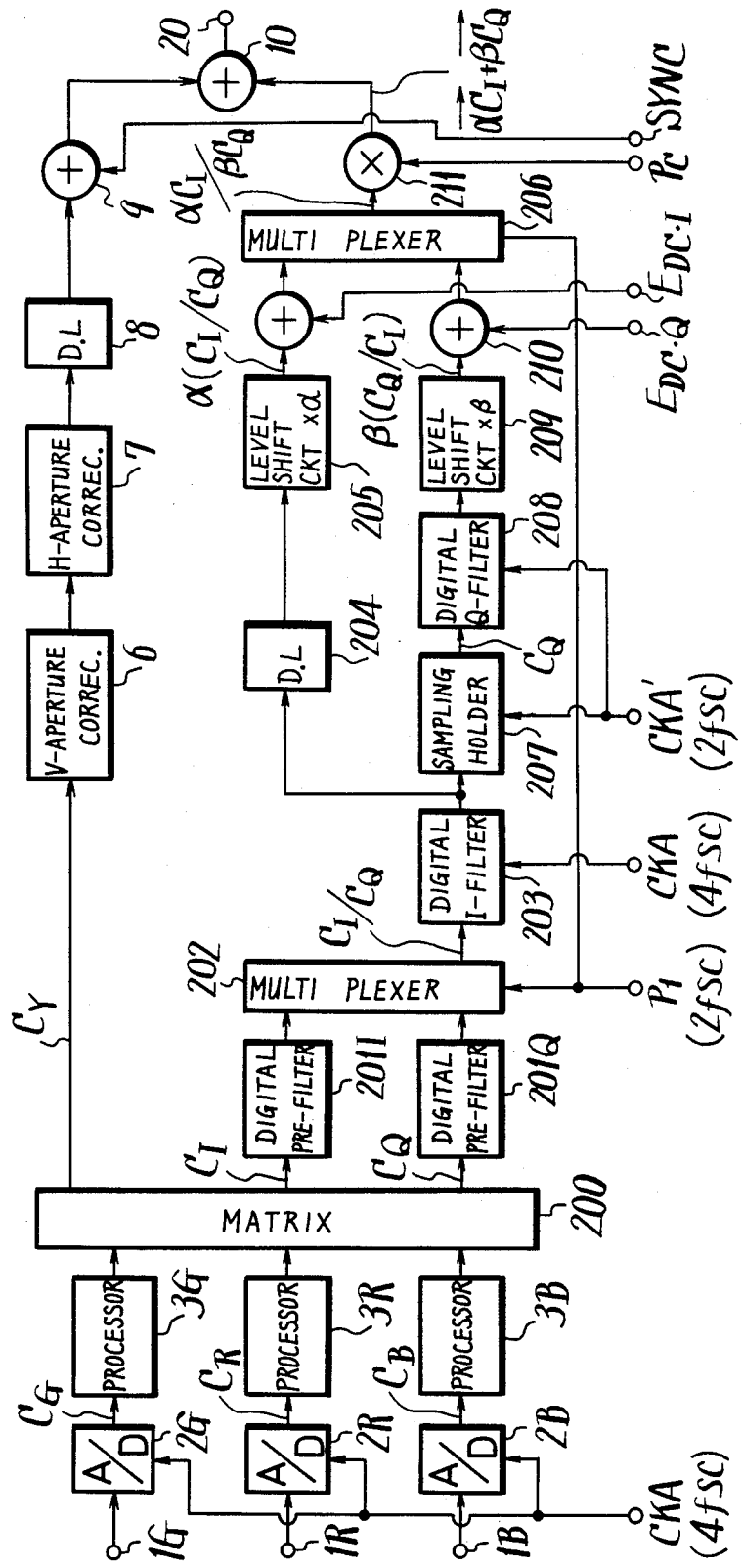
F I G. 7
F I G. 8

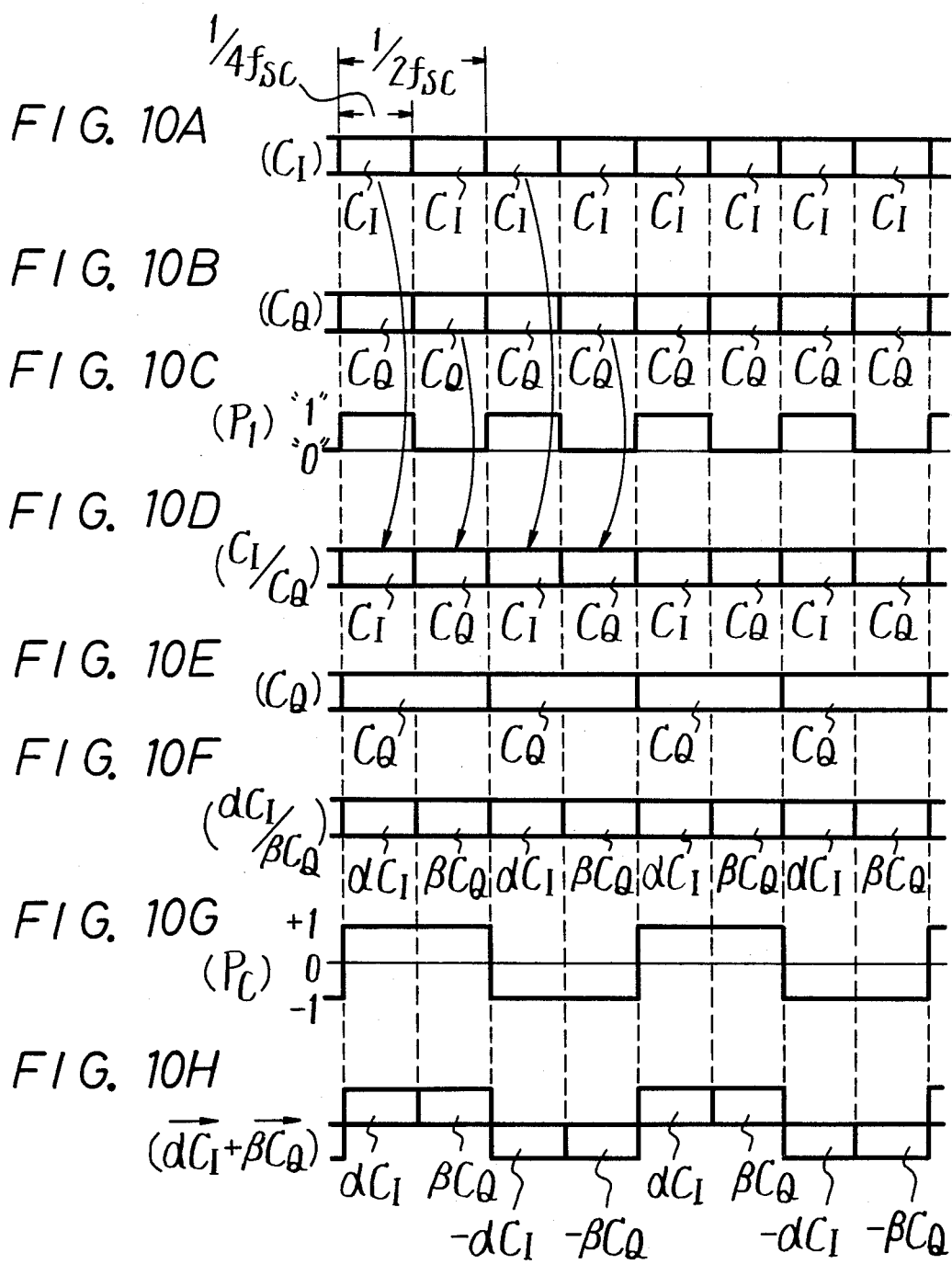

DIGITAL COLOR CAMERA

BACKGROUND OF THE INVENTION

1. Field of the Invention

The invention generally relates to a digital color camera and is directed more particularly to a digital color camera which produces an output from an imager which is digitally processed so as to provide a digital color television signal.

2. Description of the Prior Art

A digital color camera adapted to digitally process an output produced by an imager so as to provide a digital color television signal is greatly improved in signal processing, circuit arrangement, and reliability as compared to a color camera in which the color television signal is processed in analog fashion over its entire signal processing interval. Recently, for this reason, almost all of the signal processings in a color camera are being performed in digital fashion.

In the prior art when the output signal is digitally processed so as to form the color television signal, the processing rate has been selected to be a frequency which is three or four times higher than the color subcarrier frequency $f_{sc}$. This is mainly because of the ease of signal processings, for example, and ease of modulation.

In general, a color signal has a band width from 0 to 4 MHz. However, a person can discriminate a color of a pattern with a relatively large area or a band width of the television signal from 0 up to 0.5 MHz, but a person cannot discriminate a color of a fine picture image with a band width of 0.5 to 4 MHz. Accordingly, it is normal for the color signal to be limited in bandwidth so as not to cause problems in practice and to thereby obtain ease of transmission.

In digital processing, the bandwidth is limited with a digital filter of, for example, a non-recursive or FIR (finite impulse response) type.

It is known with a digital filter that as the ratio $f_c/f_s$ (where letter $f_c$ represents a cutoff frequency, for example, 800 kHz and $f_s$ represents its driving clock frequency or sampling frequency) becomes smaller, the transfer function becomes more complex and hence the number of orders has to be increased or raised and thus the circuit arrangement of the filter becomes complex. In the prior art, since $f_s$ has been selected as three or four times the color subcarrier frequency $f_{sc}$ (which is, for example, from 10.74 MHz to 14.3 MHz), the ratio $f_c/f_s$ is reduced. As a result, the arrangement of the digital filter becomes quite complex which is undesirable.

U.S. Pat. No. 4,069,501 which issued on Jan. 17, 1978, reissued as U.S. Pat. No. Re 30,800 on Nov. 17, 1981 invented by the applicant discloses techniques for eliminating aliasing noise by spatially offsetting the CCD picture elements.

SUMMARY OF THE INVENTION

Therefore, it is an object of the invention to provide a digital color camera which can obviate the aforesaid defects.

It is another object of the invention to provide a digital color camera which can lower the frequency of the driving clock signal of a digital filter.

It is a further object of the invention to provide a digital color camera which utilizes one finite impulse response filter with the finite impulse response filter being inserted into a color difference signal path where respective color signals are formed as a dot-sequential signal, so that different signals are obtained from such filter one by one as red and blue color signal systems before they are converted to the color difference signal which results in the overall circuitry for a camera to be simplified.

According to one aspect of the invention, there is provided a digital color camera comprising, means for generating first, second and third digital color signals, each with a rate of $4f_{sc}$ (where $f_{sc}$ represents a color subcarrier frequency) from the outputs of first, second and third imagers, means for forming a digital luminance signal from the first, second and third digital color signals, means for forming a dot-sequential color difference signal where first and second digital color difference signals appear alternately at every $1/4f_{sc}$ from the first, second and third digital color signals, and means for passing said dot-sequential digital color difference signal through digital filter means so as to limit the band widths of the first and second digital color difference signals.

The other objects, features and advantages of the invention will become apparent from the following description taken in conjunction with the accompanying drawings through which the like references designate the same elements and parts.

BRIEF DESCRIPTION OF THE DRAWINGS

FIGS. 2A through 2E and FIGS. 3A through 3I are respectively waveform diagrams used to explain the embodiment of the digital color camera of FIG. 1;

FIG. 4 is a connection diagram schematically showing a practical example of a digital filter of the invention;

FIG. 7 is a schematic block diagram showing a practical example of an interpolator;

FIG. 8 is a schematic of another embodiment; and

FIGS. 9A through 9H and FIGS. 10A through 10H are respectively waveform diagrams used to explain the embodiment of the digital color camera of FIG. 8.

DESCRIPTION OF THE PREFERRED EMBODIMENTS

Figure 1:
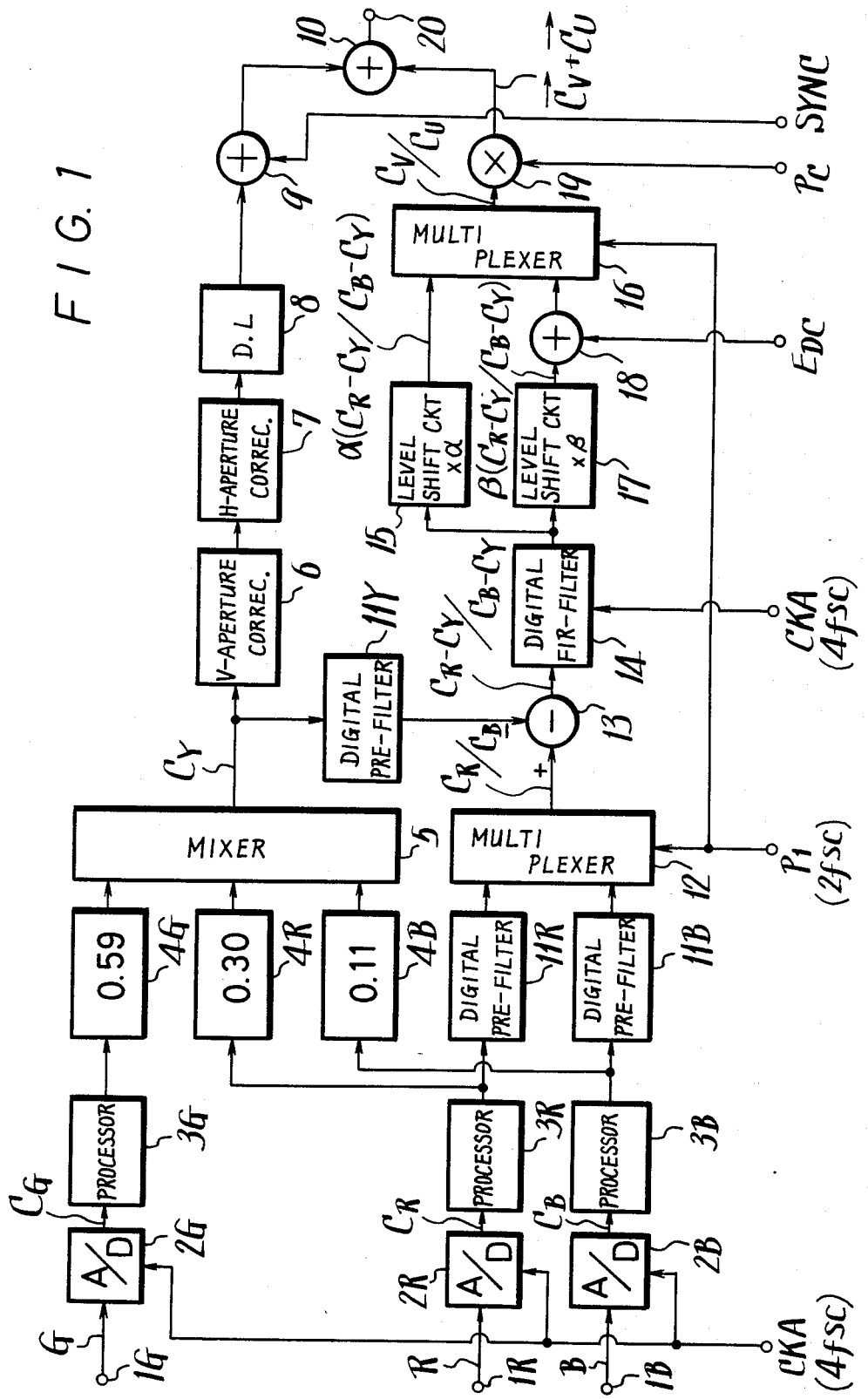
FIG. 1 is a schematic block diagram showing one embodiment of a digital color camera according to the invention.

One embodiment of a digital color camera according to the invention is shown in FIG. 1.

In this embodiment, the green, red and blue signals G, R and B are provided by a three-tube type color camera, or a three-plate type CCD (charge coupled device) color camera and the signals are digitally processed so as to produce a color television signal in which the color signal is subjected to a so-called U-V modulation.

In FIG. 1, reference characters 1G, 1R and 1B respectively denote input terminals to which the green, red and blue signals G, R and B provided by the three-tube type color camera or the three-plate type CCD color camera are respectively supplied. The green, red and blue signals G, R and B supplied to input terminals 1G, 1R and 1B are respectively supplied to A/D (analog-to-digital) converters 2G, 2R and 2B. The A/D converters 2G, 2R and 2B are supplied with a clock signal CKA with a frequency $4f_{sc}$, in which the respective color signals G, R and B are converted, at a processing rate of $4f_{sc}$, to digital color signals $C_G$, $C_R$ and $C_B$, with each having 8 bits per single sample.

The digital color signals $C_G$, $C_R$ and $C_B$ are respectively delivered to processors 3G, 3R and 3B and are subjected to processing. As is well known, the processing results in treatment of the signals so as to provide $\gamma$ correction, white clip, pedestal clamp and so on.

The digital color signals $C_G$, $C_R$ and $C_B$ thus processed are respectively supplied through level shifting circuits or shifters 4G, 4R and 4B, which serve to degrade these digital color signals $C_G$, $C_R$ and $C_B$ in level to 0.59, 0.30 and 0.11 of the inputs respectively, to an adder or mixer 5. In mixer 5, the digital color signals $C_G$, $C_R$ and $C_B$ which have been respectively degraded in level are added to each other so as to generate a digital luminance signal $C_Y$. The digital luminance signal $C_Y$ is:

$$C_Y = 0.59 C_G + 0.30 C_R + 0.11 C_B \quad (1)$$

The digital luminance signal $C_Y$ formed by the mixer 5 is supplied through vertical and horizontal aperture correction circuits or correctors 6 and 7 and a delay circuit 8 for matching the phase of the digital luminance signal $C_Y$ with a color signal, which will be discussed later, to one input of an adder 9. The other input side of adder 9 is supplied a digital vertical and horizontal synchronizing signal SYNC which is generated from a synchronizing signal generating circuit or generator (not shown), and the digital synchronizing signal SYNC is added to the digital luminance signal $C_Y$. The digital luminance signal $C_Y$ produced from adder 9 which has been added to the digital synchronizing signal SYNC is applied to one input of an adder 10.

Figure 2A:
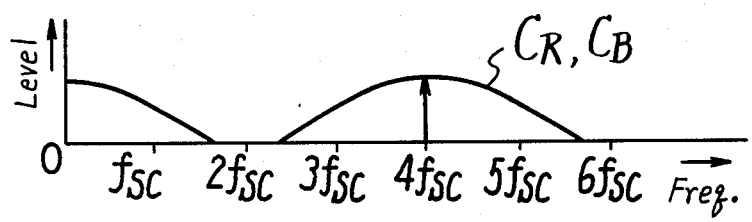
Figure 2B:
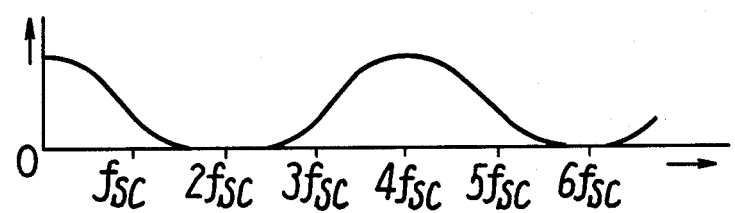
Figure 2C:
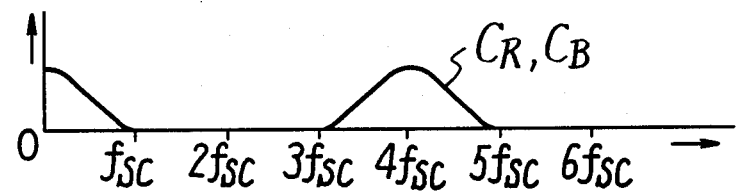

The digital red and blue color signals $C_R$ and $C_B$ derived from the processors 3R and 3B are respectively supplied to digital pre-filters 11R and 11B. Each of the digital prefilters 11R and 11B is arranged such that it has a filter characteristic so as to restrict the band width to substantially $f_{sc}$ as shown in FIG. 2B. In this case, the band width of each of the digital red and blue color signals $C_R$ and $C_B$ is about 4 MHz and the frequency spectrums of each is shown in FIG. 2A. The digital pre-filters 11R and 11B produce the digital red and blue color signals $C_R$ and $C_B$ which have band widths which are respectively restricted to substantially $f_{sc}$ as shown in FIG. 2C. An arrow in FIG. 2A indicates the central carrier.

The reason for restricting the band width of each of the digital red and blue color signals $C_R$ and $C_B$ to $f_{sc}$ in the digital pre-filters 11R and 11B is so that when the digital red and blue color signals $C_R$ and $C_B$ are switched to a dot-sequential color signal $C_R/C_B$ which is switchably changed at a rate for each of $1/4f_{sc}$ (noting either the digital red color signal $C_R$ or the digital blue color signal $C_B$ only, that color signal is a signal series which appears every $1/2f_{sc}$), the occurrence of aliasing noise will be prevented.

Each of the digital pre-filters 11R and 11B is formed as digital filters with a drive clock frequency $f_s$ of $4f_{sc}$ (14.3 MHz). But, since the cutoff frequency $f_c$ thereof is $f_{sc}$ the ratio of the normalized cutoff frequency, that is, $f_c/f_s$ will be quite large or $\frac{1}{4}$ ($=f_{sc}/4f_{sc}$), and it will be possible to construct both of the digital pre-filters 11R and 11B easier than in other prior art digital filters and it will be possible to restrict the band width of the color signal, as will be discussed later, to, for instance, 800 kHz ($f_c/f_s = 0.8$ MHz/$4f_{sc}$).

The digital red and blue color signals $C_R$ and $C_B$ produced from the digital pre-filters 11R and 11B and with restricted band widths as shown in FIGS. 3A and 3B are supplied to a multiplexer 12. Multiplexer 12 is supplied as a control signal a pulse signal $P_1$, illustrated in FIG. 3C, which is synchronized with a clock signal CKA and which has an on-duty cycle of 50%. When pulse signal $P_1$ becomes, for instance, a high level "1", the digital red color signal $C_R$ is selected by multiplexer 12, and when $P_1$ becomes a low level "0", the digital blue color signal $C_B$ is selected. Therefore, multiplexer 12 provides the dot-sequential digital color signal $C_R/C_B$ as shown in FIG. 3D and the digital red and blue color signals $C_R$ and $C_B$ are alternately extracted every $1/4f_{sc}$.

Figure 2D:
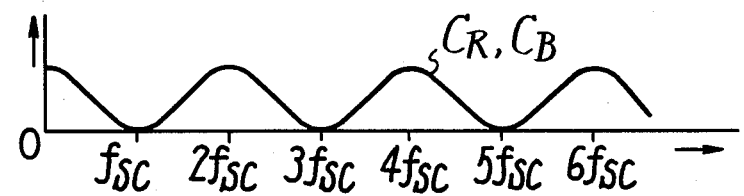
Figure 2E:
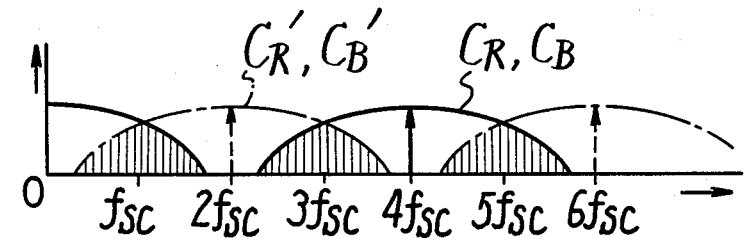

In this case, in the dot-sequential digital color signal $C_R/C_B$, each of the digital red and blue color signals $C_R$ and $C_B$ becomes a series of $2f_{sc}$. That is, if only the digital red color signal $C_R$ is observed, by way of example, it will appear each $1/2f_{sc}$. But, as described above, in the digital pre-filters 11R and 11B, the band widths of the digital red and blue color signals $C_R$ and $C_B$ are limited to $f_{sc}$ in advance, so that the frequency spectrum at this time is as illustrated in FIG. 2D and hence no aliasing noise occurs. In other words, when the digital red and blue color signals $C_R$ and $C_B$ are not passed through digital pre-filters 11R and 11B, as shown in FIG. 2E, the carrier side band signal components $C_R'$ and $C_B'$ due to the switching operation of the digital red and blue color signals $C_R$ and $C_B$ caused by the multiplexer 12 are superimposed upon the frequency components of the original digital red and blue color signals $C_R$ and $C_B$ (refer to FIG. 2A) thus resulting in aliasing noise (shown by hatchings in FIG. 2E).

This dot-sequential digital color signal $C_R/C_B$ is supplied to one input of a subtractor 13 which serves to generate a color difference signal. Subtractor 13 is supplied at its other input with a digital luminance signal $C_Y$ as shown in FIG. 3E and provided from the mixer 5 through a digital pre-filter 11Y.

The digital pre-filter 11Y is arranged the same as the digital pre-filters 11R and 11B and has a filter characteristic so as to limit the band width to substantially $f_{sc}$. Accordingly, in digital pre-filter 11Y, the band width of the digital luminance signal $C_Y$ is restricted substantially to $f_{sc}$.

In the subtractor 13, the digital luminance signal $C_Y$ is subtracted from the dot-sequential digital color signal $C_R/C_B$. Thus, subtractor 13 produces a dot-sequential digital color difference signal $C_R - C_Y/C_B - C_Y$ as shown in FIG. 3F.

The dot-sequential digital color difference signal $C_R - C_Y/C_B - C_Y$ is supplied to a digital filter 14 for restricting the band of the color difference signal to, for example, 800 kHz. For the digital filter 14, there is generally used a digital filter with a symmetrical impulse response, for example, a finite impulse response type (FIR type) digital filter in order to achieve stability during processing and to make the group delay characteristic uniform.

FIG. 4 shows one example of a FIR type digital filter 14, in which characters $D_{1a}$, $D_{1b}$, $D_{2a}$, $D_{2b}$, ..., $D_{8a}$, $D_{8b}$ represent operators, respectively. Each of the operators $D_{1a}$, $D_{1b}$, $D_{2a}$, $D_{2b}$, ..., $D_{8a}$, $D_{8b}$ is operated by the clock signal CKA of $4f_{sc}$ to allow a delay of $1/4f_{sc}$ to be produced. In this case, since the dot-sequential color difference signal $C_R-C_Y/C_B-C_Y$ supplied to the digital filter 14 is a signal such that the digital red and blue color signals $C_R-C_Y$ and $C_B-C_Y$ are alternately extracted every $1/4f_{sc}$ as shown in FIG. 3F. The operators $D_{1a}$, $D_{1b}$, $D_{2a}$, $D_{2b}$, ..., $D_{8a}$, $D_{8b}$, $D_{1a}$, $D_{1b}$; $D_{2a}$, $D_{2b}$; ..., $D_{8a}$, $D_{8b}$ are respectively connected in series so as to produce new operators $D_1$, $D_2$, ..., $D_8$, each with a delay of $1/2f_{sc}$. The FIR type digital filter 14 is constructed with the use of the new operators $D_1$, $D_2$, ..., $D_8$.

In this case, since the digital filter 14 is formed comprised of the new operators $D_1$, $D_2$, ..., $D_8$, each having the delays of $1/2f_{sc}$, it is to be seen that the digital filter 14 has a driving clock frequency of substantially $2f_{sc}$. Therefore, it is designed to have a cutoff frequency of substantially 800 kHz. Speaking more precisely, it is designed with a normalized frequency of $2f_{sc}$ if the transfer function is taken as $H(Z^{-2})$.

In FIG. 4, reference numerals 140, 141, ..., 143 designate adders, respectively; 144, 145, ..., 148 designate multipliers, respectively, in which impulse response coefficients $h_0$, $h_1$, ..., $h_4$ are multiplied; and an adder or mixer 149 adds the outputs of the multipliers 144, 145, ..., 148.

Now, let us consider a case where the dot-sequential digital color difference signal $C_R-C_Y/C_B-C_Y$ is as shown in FIG. 3F and is supplied to an input terminal 14A of the digital filter 14. Since each of the operators $D_1$, $D_2$, ..., $D_8$ has a delay of $1/2f_{sc}$, when the input terminal 14A is supplied with the digital red color difference signal $C_R-C_Y$, each of the outputs from the operators $D_1$, $D_2$, ..., $D_8$ equals only the digital red color difference signal $C_R-C_Y$. Thus, at this time, from output terminal 14B of the mixer 149, there is provided the digital red color difference signal $C_R-C_Y$ whose band width is restricted to substantially 800 kHz. Similarly, when the input terminal 14A is supplied with the digital blue color difference signal $C_B-C_Y$ then at the output terminal 14B, there will be provided the digital blue color difference signal $C_B-C_Y$ whose band width is limited to substantially 800 kHz. Thus, digital filter 14 produces the dot-sequential digital color difference signal $C_R-C_Y/C_B-C_Y$ with the band width being restricted to substantially 800 kHz.

Refering back to FIG. 1, the dot-sequential digital color difference signal $C_R-C_Y/C_B-C_Y$ which is produced from digital filter 14 and of which the band width has been restricted is supplied to a level shifting circuit or shifter 15, in which the level is adjusted to $\alpha$ for example, 1/1.14 times that of the original level, and the output is delivered to a multiplexer 16. Also, the dot sequential digital color difference signal $C_R-C_Y/C_B-C_Y$ is supplied to a level shifting circuit or shifter 17, where it is dropped or lowered in level by $\beta$, for example, 1/2.03 times that of the original level, and then is delivered to one input of an adder 18.

Adder 18 is supplied at its other input with a DC signal $E_{DC}$ which has a predetermined level at a predetermined position of a back porch of a horizontal synchronizing signal added to the digital luminance signal $C_Y$. In this case, during the period when this DC signal $E_{DC}$ is supplied to the adder 18, the outputs of the level shifting circuits 15 and 17 are in the state when no signal is present. Also, the DC signal $E_{DC}$ which will be inserted so as to form a digital burst signal is inserted into the system so as to extract $\beta(C_R-C_Y)$ because the phase of the burst signal in the NTSC (National Television Systems Committee) signal exists on a $C_B-C_Y$ axis. Therefore, adder 18 produces a dot-sequential digital color difference signal $\beta(C_R-C_Y/C_B-C_Y)$ to which the DC signal $E_{DC}$ is added and which is then supplied to the multiplexer 16.

The multiplexer 16 is supplied with the pulse signal $P_1$ as its control signal which is supplied to the multiplexer 12 as shown in FIG. 3C. When pulse signal $P_1$ is at the high level "1", multiplexer 16 is adapted to extract the dot-sequential digital color difference signal $\alpha(C_R-C_Y/C_B-C_Y)$ supplied from the level shifting circuit 15. That is, at this time, the signal $\alpha(C_R-C_Y)$ (hereinafter, referred to as signal $C_V$) is extracted. Whereas, when the pulse signal $P_1$ is at the low level "0", the multiplexer 16 will extract the dot-sequential digital color difference signal $\beta(C_R-C_Y/C_B-C_Y)$ supplied from the adder 18. That is, at this time, the signal $\beta(C_B-C_Y)$ (hereinafter, referred to as signal $C_U$) is extracted. Accordingly, multiplexer 16 produces a dot-sequential digital color difference signal $C_V/C_U$ including the signals $C_V$ and $C_U$ which are alternately extracted every $1/4f_{sc}$ as illustrated in FIG. 3G.

In this case, in the adder 18, the DC signal $E_{DC}$ added to the digital luminance signal $C_Y$ for forming the color burst signal is converted to a pulse signal with a frequency $2f_{sc}$. This is because the zero level and an $E_{DC}$ level of the DC signal $E_{DC}$ are switched for each other at the frequency of $2f_{sc}$.

Also, the dot-sequential digital color difference signal $C_V/C_U$ is supplied to a modulation multiplier 19. The multiplier 19 is supplied with a carrier $P_C$ with a frequency of $f_{sc}$ and its first half is represented by $+1$ and the second half is represented by $-1$ as shown in FIG. 3H so as to carry out multiplication. Thus, modulation multiplier 19 produces a digital color difference signal $\vec{C}_V + \vec{C}_U$ which is orthogonally two-phase-modulated as shown in FIG. 3I.

In this case, the pulse signal whose frequency is changed to $2f_{sc}$ in the multiplexer 16 is multiplied with the carrier $P_C$ in multiplier 19 and is thereby arranged as a color burst signal with a frequency $f_{sc}$.

Also, the digital modulated color difference signal $C_V + C_U$ produced by the multiplier 19 is supplied to the other input of the adder 10. In adder 10, the digital modulated color difference signal $\vec{C}_V + \vec{C}_U$ is added to the digital luminance signal $C_Y$ to form a digital television signal. Thus, the digital television signal is produced at an output terminal 20 at the output of adder 10.

As described above, in accordance with the digital color camera of the invention, the digital red and blue color signals $C_R$ and $C_B$ are passed through the digital chroma multiplexer 12 and are converted to a dot-sequential digital color difference signal $C_R/C_B$ and then is supplied to the digital filter 14 for band width limiting. Therefore, it is not necessary to provide independent digital filters for the respective digital color signals individually and the circuitry will be substantially simplified.

In addition, since the dot-sequential digital color difference signal is provided, with the transfer function of the digital filter as $H(Z^{-2})$, it is possible to design the digital filter with the normalized frequency $2f_{SC}$. In other words, it is possible to design the digital filter with a substantial driving clock frequency of $2f_{sc}$. Therefore, since $f_c/f_s$ (where character $f_c$ represents the cutoff frequency and $f_s$ represents the drive clock frequency) becomes larger than in the prior art without making the order number large, and of the digital filter can be simply constructed.

Speaking more practically, according to the invention, the normalized cutoff frequency ratio $f_c/2f_{sc}$ is not selected to be $(f_c/4f_{sc}) = (800 \text{ kHz}/14.3 \text{ MHz})$ but can be $(f_c/2f_{sc}) = (800 \text{ kHz}/7.2 \text{ MHz})$, so that the design of the digital FIR filter can be simpler and less expensive.

Figure 5:
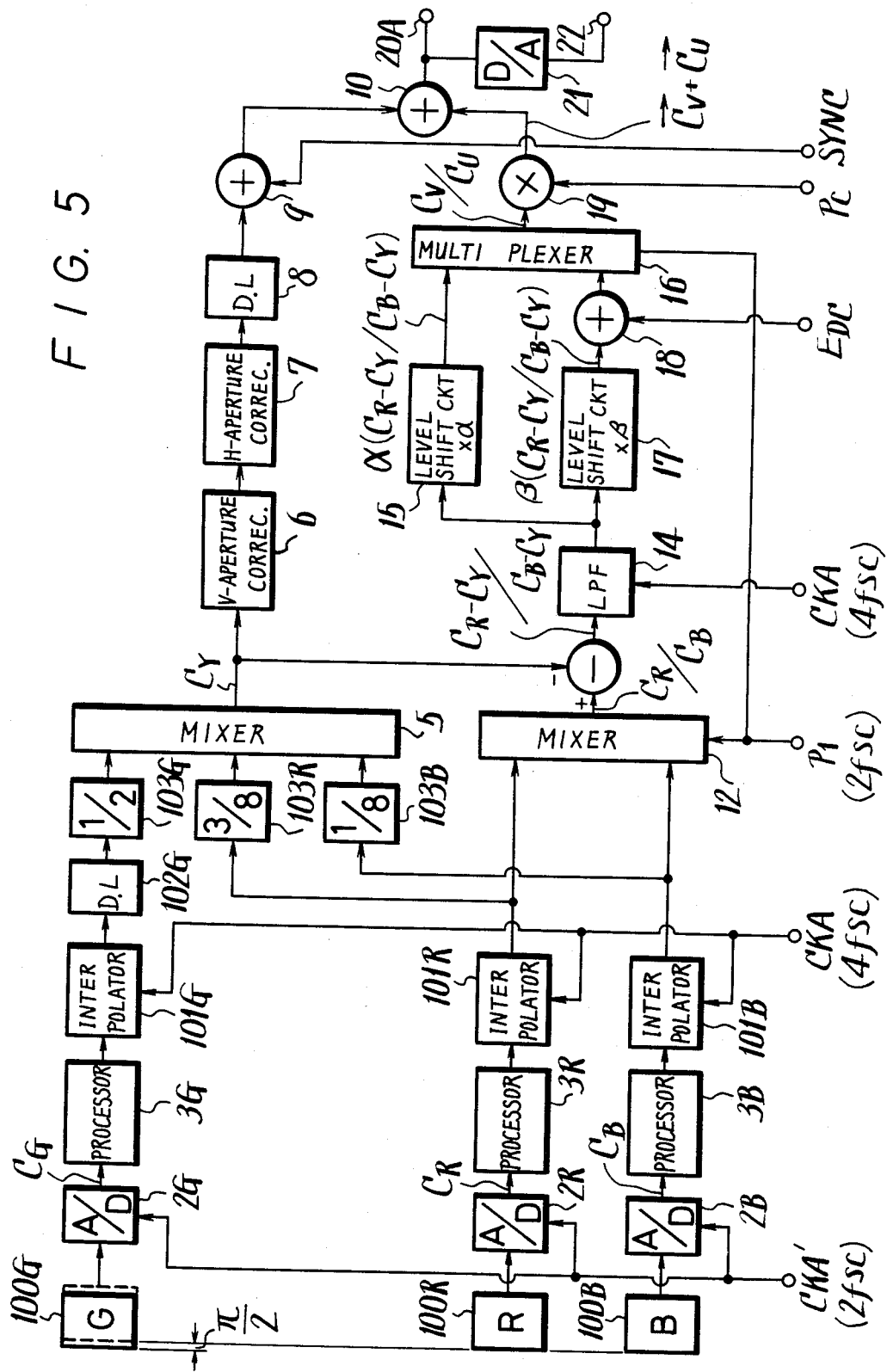
FIG. 5 is a schematic block diagram showing another embodiment of a digital color camera according to the invention.

FIGS. 5 and 6 show another embodiment of the invention. Like reference corresponding to those of FIG. 1 designate the same elements and parts which will not be explained in detail.

FIG. 5 relates to an example in which the green, red and blue color signals G, R and B provided by the three plate type CCD color camera are digitally processed so as to obtain the color television signal and the color signal is subjected to the so-called U-V modulation.

Figure 6A:
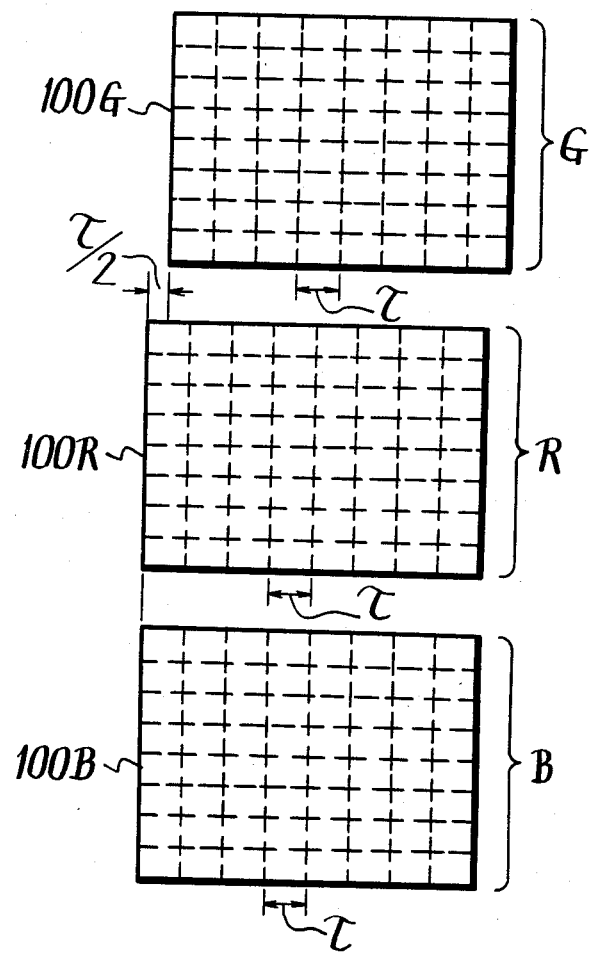
FIG. 6A illustrates the spatial relationship of a solid state imager.

In FIG. 5, CCDs 100G, 100R and 100B each comprise a solid-state imager. The CCDs 100G, 100R and 100B respectively produce green, red and blue signals G, R and B, each with a sampling frequency or rate of $2f_{sc}$. As shown in FIG. 6A, the CCDs 100G, 100R and 100B are spacially arranged such that the CCD 100G is laterally offset for spatial sampling phase from the CCDs 100R and 100B by $\tau/2$ (where $\tau$ represents the arranging pitch of picture elements in the horizontal direction). This offset is utilized to prevent aliasing noise from occurring. As seen in FIG. 6A, CCDs 100R and 100B are vertically aligned, but CCD 100G is offset to the right by $\tau/2$.

The green, red and blue color signals G, R and B generated from the CCDs 100G, 100R and 100B are supplied to the respective A/D converters 2G, 2R and 2B. The A/D converters 2G, 2R and 2B are all supplied with a clock signal CKA' with a frequency of $2f_{sc}$, and the respective green, red and blue color signals G, R and B are converted to the digital color signals $C_G$, $C_R$ and $C_B$ of, for instance, 8 bits per sample at the processing rate of $2f_{sc}$.

Then, the digital color signals $C_G$, $C_R$ and $C_B$ are supplied to respective processors 3G, 3R and 3B, in which they are processed and then delivered to interpolating circuits or interpolators 101G, 101R and 101B so as to respectively convert them to a rate at a signal frequency of $4f_{sc}$. By way of example, the interpolator 101G has a transfer function of:

$$H(Z) = 1 + Z^{-1}$$

and is forrmed as shown in FIG. 7. In FIG. 7 an operator circuit 41 which comprises a D flip-flop or the like which is driven by the clock signal CKA at the frequency $4f_{sc}$ and operator circuit 41 has a delay of $1/4f_{sc}$. The output of processor 3G is added to the output from operator circuit 41 in an adder or mixer 42. The output of adder 42 is supplied to and lowered in level to $\frac{1}{2}$ by a level shifting circuit or shifter 43 and supplied to as the output of the interpolator 101G. Since one sample is converted into two samples with a period of $1/4f_{sc}$ by the signal processing operation as mentioned above, the signal processing rate is converted from $2f_{sc}$ to $4f_{sc}$. In this case, if the interpolator 101G is constructed such that the transfer function H(z) is:

$$H(z) = 1 + \tfrac{1}{2}(z + z^{-1})$$

the processing rate will be similarly converted from $2f_{sc}$ to $4f_{sc}$. The other interpolators 101R and 101B are formed the same as the one illustrated in FIG. 7, and their detailed description will not repeated.

The digital green color signal $C_G$ which has been converted in rate to the signal frequency of $4f_{sc}$ in the interpolator 101G is supplied to a delay circuit 102G which has a delay time of $1/4f_{sc}$. This delay time $1/4f_{sc}$ is used to correct for the phase differences between the green color signal G and red and blue color signals R and B due to the difference in the spatial sampling phase by $\tau/2$ between the CCD 100G and CCDs 100R and 100B as illustrated in FIG. 6A. In other words, this is because the drive clock frequency for the picture element of the CCD is $2f_{sc}$ and in this case, the delay of a $\frac{1}{2}$ picture element has to be taken into consideration. The output of delay circuit 102G is supplied to and lowered in level to $\frac{1}{2}$ by a level shifting circuit or shifter 103G, and then delivered to the mixer 5.

The digital red and blue signals $C_R$ and $C_B$ produced by the interpolators 101R and 101B are respectively supplied to and lowered in level to $\frac{3}{8}$ and $\frac{1}{8}$ by level shifters 103R and 103B, and the outputs of shifters 103R and 103B are fed to the mixer 5.

In the mixer 5, the digital green, red and blue signals $C_G$, $C_R$ and $C_B$ whose levels have been respectively lowered to $\frac{1}{2}$, $\frac{3}{8}$ and $\frac{1}{8}$ are added together to form the digital luminance signal $C_Y$ which can be expressed as follows:

$$C_Y = \tfrac{1}{2}C_G + \tfrac{3}{8}C_R + \tfrac{1}{8}C_B \tag{2}$$

Accordingly, since the level of $\frac{1}{2}$ of the digital green color signal $C_G$ and the added levels of $\frac{3}{8} + \frac{1}{8}$ of the digital red and blue color signals $C_R$ and $C_B$ are selected to be in one to one relation and also since the spatial sampling phase of CCD 100G deviates from the phases of CCDs 100R and 100B by $\tau/2$, aliasing noise will not occur. This method is called the spatial offsetting technique of picture elements.

Figure 6B:
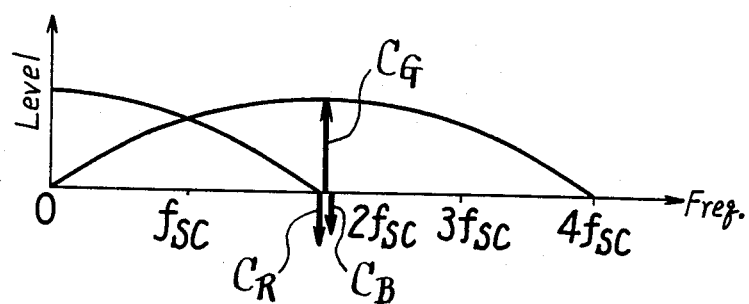
FIG. 6B shows the output of the imager of FIG. 6A.

The manner that the aliasing noise is cancelled by this method is discussed in detail U.S. Pat. No. 4,069,501 which issued on Jan. 17, 1978 and which was reissued as U.S. Pat. No. 30,800 which issued on Nov. 17, 1981. These patents are by the same inventor. This method can be understood by refering to FIG. 6B. The spectrum diagram of FIG. 6B illustrates the output of the mixer 5. In the spectrum diagram, carriers $C_G$, $C_B$ and $C_R$ of the color signals produced by the driving clock are controlled in amplitude as described before and in addition, the phase relationship among the carriers is indicated by the positions of the vector representations of FIG. 6B. Thus, when a white object is picked up, its carrier is balanced and hence its sampling side band is balanced, and these cancel each other.

Also, the digital red and blue signals $C_R$ and $C_B$ derived from the interpolators 101R and 101B are supplied to the multiplexer 12. Multiplier 12 produces a dot-sequential digital color signal $C_R/C_B$ by extracting the digital red and blue signals $C_R$ and $C_B$ every $1/4f_{sc}$. In this case, by observing one color difference signal, for example, $C_R - C_Y$ which has a signal series with a signal rate of $1/2f_{sc}$.

The dot-sequential digital color signal $C_R/C_B$ is supplied to one input of the subtractor 13 which serves to generate the color difference signals. Subtractor 13 is supplied at its other input with the digital luminance signal $C_Y$ provided by the mixer 5. In subtractor 13, the digital luminance signal $C_Y$ is subtracted from the dot-sequential digital color signal $C_R/C_B$ and thus the dot-sequential digital color difference signal $C_R-C_Y/C_B-C_Y$ is produced.

The color difference signal $C_R-C_Y/C_B-C_Y$ is delivered to the digital filter 14 to limit the band width of the color difference signal to, for example, 800 kHz, and thus it is restricted in band width.

The other elements of FIG. 5 are similar to those of the embodiment shown in FIG. 1.

As described above, the digital color camera according to the embodiment seen in FIG. 5 has a similar function and effect as the embodiment of FIG. 1. In addition, according to the embodiment of FIG. 5, since the aliasing noise is prevented by the so-called spatial offsetting technique, the digital pre-filters 11R and 11B seen in FIG. 1 are not required. Also, the input of the digital low pass filter becomes the rate series of $2f_{sc}$ and hence $f_c/2f_{sc}=800$ kHz/7.2 MHz is established. This ratio is sufficiently large and thus the digital filter can be of a simple form.

FIG. 8 illustrates an embodiment where the green, red and blue color signals G, R and B are produced from the three-tube type color camera and the three-plate type CCD color camera and are digitally processed so as to provide the color television signal and in which the color signals are subjected to a so-called I-Q modulation.

In FIG. 8, the digital color signals $C_G$, $C_R$ and $C_B$ are treated by the processing operation and are all supplied to a matrix circuit 200. Matrix circuit 200 performs calculations as follows:

$$C_Y=0.59\ C_G+0.3\ C_R+0.11\ C_B \qquad (3)$$

$$C_I=0.28\ C_G+0.60\ C_R-0.32\ C_B \qquad (4)$$

$$C_Q=-0.52\ C_G+0.21\ C_R+0.31\ C_B \qquad (5)$$

thus the digital luminance signal $C_Y$ and digital I and Q signals $C_I$ and $C_Q$ are formed in matrix 200.

The digital luminance signal $C_Y$ is subjected to aperture correction phase correction and delay and the synchronizing signal SYNC is added as in the embodiment shown in FIG. 1.

Figure 9A:
Figure 9B:
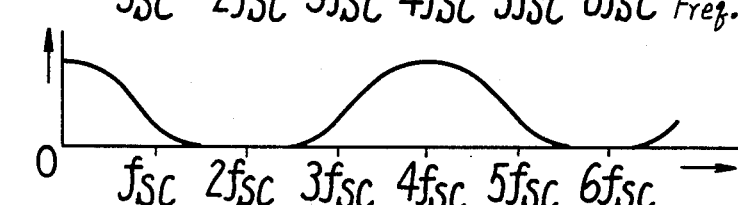
Figure 9C:
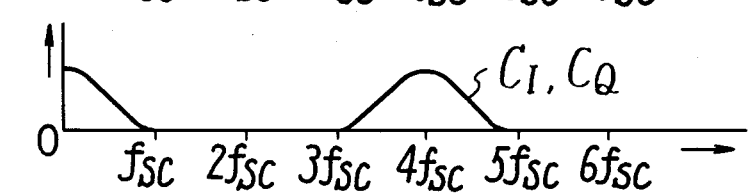

The digital I and Q signals $C_I$ and $C_Q$ are respectively supplied to digital pre-filters 201I and 201Q. Each of the digital pre-filters 201I and 201Q is formed so as to have a filter characteristics such as shown in FIG. 9B, that is, to restrict the band width to substantially $f_{sc}$. In this case, the band widths of each of the digital I and Q signals $C_I$ and $C_Q$ will be substantially 4 MHz and hence the frequency spectrums will be as indicated in FIG. 9A. Therefore, digital pre-filters 201I and 201Q produce the digital I and Q signals $C_I$ $C_Q$ which have band widths which are respectively limited to approximately $f_{sc}$ as shown in FIG. 9C.

The reason why in digital pre-filters 201I and 201Q, the band widths of the digital I and Q signals $C_I$ and $C_Q$ are limited to $f_{sc}$ as discussed above is, as will be discussed later, when they are converted to a dot-sequential digital color signal $C_I/C_Q$ in place of the sequential digital I and Q signals $C_I$ and $C_Q$ at every $1/4f_{sc}$, is to avoid the occurrence of aliasing noise.

In this case, the digital pre-filters 201I and 201Q are formed as digital filters and their driving clock frequency $f_s$ is $4f_{sc}$. But, since the cutoff frequency $f_c$ is $f_{sc}$ and hence the ratio $f_c/f_s$ is as large as $\frac{1}{4}$, as compared with other digital filter for restricting the band width of a color signal, as, for example, to 0.5 MHz and 1.5 MHz, it is possible to construct the filter easier since they are simple devices.

The digital I and Q signals $C_I$ and $C_Q$ generated from the digital pre-filters 201I and 201Q and which have limited band widths as shown in FIGS. 10A and 10B are supplied to a multiplexer 202. Multiplexer 202 is supplied with a control signal which is the pulse signal $P_1$ which is synchronized with the clock signal CKA and which has an on-duty of 50% as shown in FIG. 10C. When pulse signal $P_1$ is at, for example, a high level of "1", the digital I signal $C_I$ is extracted by multiplexer 202, while it is at a low level of "0", the digital Q signal $C_Q$ is supplied by multiplexer 202. Accordingly, multiplexer 202 produces a dot-sequential digital color difference signal $C_I/C_Q$ by alternately extracting the digital I and Q signals $C_I$ and $C_Q$ at every $1/4f_{sc}$ as shown in FIG. 10D.

Figure 9D:
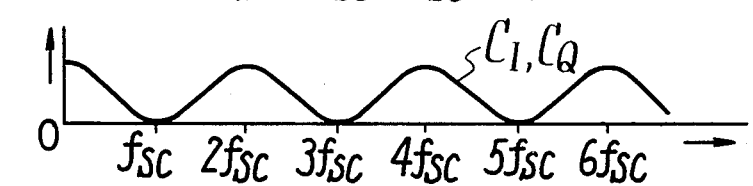

In this case, in this dot-sequential digital color difference signal $C_I/C_Q$, each of the digital I and Q signals $C_I$ and $C_Q$ have the frequency series of $2f_{sc}$. However, as described above, since the band widths of these digital I and Q signals $C_I$ and $C_Q$ are limited to $f_{sc}$ in the digital pre-filters 201I and 201Q, the frequency spectrum at this time becomes such as shown in FIG. 9D, and no aliasing noise will occur.

Figure 9E:
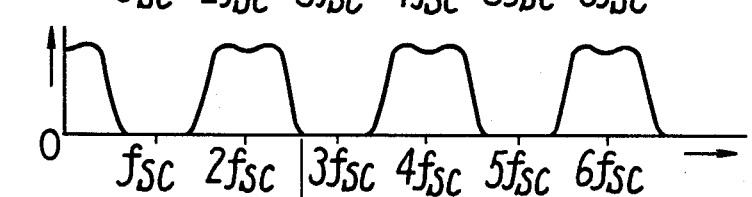

This dot-sequential digital color difference signal $C_I/C_Q$ is supplied to a digital filter 203 which has a frequency characteristic which limits the band width of such dot-sequential digital color difference signal $C_I/C_Q$ for example, to 1.5 MHz (the band width limit of the digital I signal $C_I$) as shown in FIG. 9E. As the digital filter 203, there is utilized a digital filter of, for instance, the FIR type which is like the described digital filter 14 used in the embodiment seen in FIG. 1. In this case, since the digital filter 203 is formed with new operators, each with a delay of $1/2f_{sc}$, digital filter 203 may have the drive clock frequency of substantially $2f_{sc}$. Thus, the digital filter 203 is designed in such a manner so as to obtain a cutoff frequency of substantially 1.5 MHz. Also, in this case, the ratio of the normalized cutoff frequency is expressed as $(f_c/f_s)=(1.5$ MHz/7.2 MHz) which is relatively large. Therefore, this digital filter 203 can be easily designed and constructed.

Figure 9F:
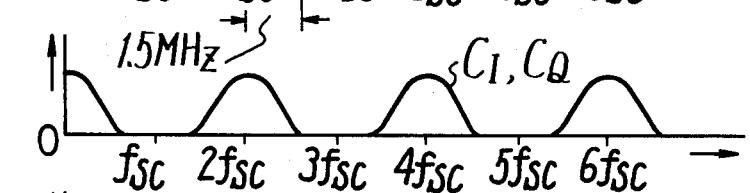

The dot-sequential digital color difference signal $C_I/C_Q$ produced from the digital filter 203 and which has a band width limited as shown in FIG. 9F is supplied through a delay circuit 204 a level shifting circuit 205 and an adder 210 to a multiplexer 206. The delay time of the delay circuit 204 is selected to have a value which is required to cause coincidence with the dot-sequential digital color difference signal $C_I/C_Q$ passing through the other route, which will be mentioned later, so that the signals will have the same phase. Also, the level shifting circuit 205 adjusts the level of the above mentioned dot-sequential digital color difference signal $C_I/C_Q$ to be $\alpha$ times, for instance, one time so as to compensate for a loss or the like occurring in the transmission path.

The dot-sequential digital color difference signal $C_I/C_Q$ provided by the digital filter 203 is also applied to a sample-and-hold circuit 207. Sample-and-hold circuit 207 is supplied with the clock signal CKA' with a frequency of $2f_{sc}$, whereby in the dot-sequential digital color difference signals $C_I/C_Q$, only the digital Q signal $C_Q$ is sampled and it is then held for a period of $1/2f_{sc}$. Accordingly, the sample-and-hold circuit 207 provides a signal $C_Q$ as shown in FIG. 10E.

Figure 9G:
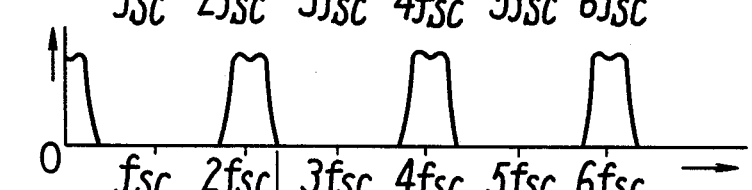

This signal $C_Q$ is supplied to a digital filter 208 which has a frequency characteristic as is shown in FIG. 9G and which restricts the band width of the signal $C_Q$ to, for example, 0.5 MHz (the band width limit of the digital Q signal $C_Q$). The digital filter 208 operates at the driving clock frequency $2f_{sc}$. In this case, while the cutoff frequency $f_c$ is 0.5 MHz, the drive clock frequency $f_s$ is $2f_{sc}$, so that the normalized cutoff frequency ratio $f_c/f_s$ is not reduced so much and the digital filter 208 can be easily constructed. In other words, in the design of the digital filter it becomes easier to filter the digital Q signal $C_Q$ of the $2f_{sc}$ series than it is to filter the digital Q signal $C_Q$ which has the rate series of $4f_{sc}$ because (0.5 MHz/4 MHz) < (0.5 MHz/2 MHz). In this case, the Q-digital filter 208 is arranged to have a characteristic as the I-digital filter 203 to pass the digital Q signal $C_Q$.

Figure 9H:
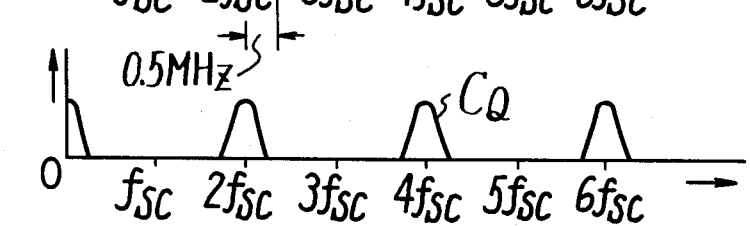

The digital Q signal $C_Q$ produced from the digital filter 208 which has a limited band width as shown in FIG. 9H is supplied through a level shifting circuit 209 to one input of an adder 210. In the level shifting circuit 209, the loss or the like in the transmission of the signal can be compensated by adjusting the level of the digital Q signal $C_Q$ to be $\beta$ times, for instance, one time.

To the other input of the adder 210, there is supplied a DC signal $E_{DCQ}$ with a predetermined level at a predetermined position of the back porch of the horizontal synchronizing signal $C_Y$ added to the digital luminance signal $C_Y$. Then, adder 210 provides a digital Q signal $\beta C_Q$ in which the DC signal $E_{DCQ}$ is added to the digital Q signal $C_Q$, which is then supplied to the multiplexer 206. In this case, there is provided a DC adder 210' at the output side of the other level shifting circuit 205, whereby a DC voltage $E_{DCI}$ is added to the digital I signal $C_I$. Then the outputs of the adders 210 and 210' are multiplexed with each other in the multiplexer 206, and a burst signal of a burst axis, that is, $-(R-Y)$ axis is formed from the I- and Q-axis signal components.

The multiplexer 206 is supplied as its control signal the pulse signal $P_1$ as shown in FIG. 10C. When pulse signal $P_1$ becomes the high level of "1", a signal is extracted in the multiplexer 206 from the dot-sequential digital color difference signal $\alpha(C_I/C_Q)$ supplied from the level shifting circuit 205. That is, the signal $\alpha C_I$ is extracted. Whereas, when the pulse signal $P_I$ becomes the low level of "0", the digital Q signal $\beta C_Q$ supplied from the adder 210 is extracted in the multiplexer 206. Accordingly, multiplexer 206 produces a dot-sequential digital color difference signal $\alpha C_I/\beta C_Q$ by alternately extracting the digital I and Q signals $\alpha C_I$ and $\beta C_Q$ at every $1/4f_{sc}$ as shown in FIG. 10F.

In this case, the DC signal $E_{DCQ}$ added in the adder 210 to the digital Q signal $\beta C_Q$ for generating the color burst signal is converted to the pulse signal at a frequency of $2f_{sc}$.

Also, the dot-sequential color difference signal $\alpha C_I/\beta C_Q$ is supplied to a modulation multiplier 211. The multiplier 211 is supplied with a carrier $P_C$ with a frequency of $f_{sc}$ whose first half becomes $+1$ and whose second half becomes $-1$ as shown in FIG. 10G so as to carry out the multiplication. The multiplier 211 produces a digital color difference signal $\alpha \vec{C}_I + \beta \vec{C}_Q$ which is orthogonally two-phase modulated as shown in FIG. 10H.

In this case, the pulse signal whose frequency is converted to $2f_{sc}$ in the multiplexer 206 is supplied to and multiplied with the carrier $P_C$ in multiplier 211, and it is converted to a color burst signal with the frequency of $f_{SC}$.

The digital modulated color difference signal $\alpha \vec{C}_I + \beta \vec{C}_Q$ derived from the multiplier 211 is supplied to the other input side of the adder 10. In adder 10, the digital luminance signal $C_Y$ is added with the digital modulated color difference signal $\alpha \vec{C}_I$ and $\beta \vec{C}_Q$ so as to form a digital television signal. Thus, the digital television signal is produced at output terminal 20 at the output of adder 10.

As described above, with the embodiment of the invention shown in FIG. 8, it is possible to achieve the same advantages and effects as with the embodiment of FIG. 1.

The above description is given for preferred embodiments of the invention, but it will be apparent that many modifications and variations could be effected by one skilled in the art without departing from the spirit and scope of the novel concepts of the invention, so that the scope of the invention should be determined only by the appended claims.

I claim as my invention:

1. A digital color camera comprising, means for generating first, second and third digital color signals each at a rate of $4f_{sc}$ (where $f_{sc}$ represents the color subcarrier frequency) from outputs of first, second and third imagers, means for forming a digital luminance signal from said first, second and third digital color signals, means for forming a dot-sequential color difference signal in which first and second digital color difference signals appear alternately every $1/4f_{sc}$ from said first, second and third digital color signals, and digital filter means receiving said dot-sequential digital color difference signal so as to limit the band widths of said first and second digital color difference signals.

2. A digital color camera as recited in claim 1, wherein the clock rate of input signals to said digital filter means is selected to be $2f_{sc}$ and said digital filter means filter said dot-sequential color difference signal.

3. A digital color camera as recited in claim 2, including prefilter means in front of said digital filter means for said dot-sequential color digital difference signal and in said respective color signal systems for eliminating aliasing noise.

4. A digital color camera as recited in claim 1, wherein said first, second and third imagers are each a solid state color imager and produce respectively digital color signals, each at a signal clock rate of $4f_{sc}$.

5. A digital color camera as recited in claim 4, wherein said first, second and third solid state color imagers are formed as solid state color imagers and have discrete type sensing elements and at least one of said sensing elements arranged in aspatial offset relationship to the other ones.

6. A digital color camera as recited in claim 5, wherein each of said imagers are formed of a charge coupled device.

7. A digital color camera as recited in claim 6, including a digital interpolator and said charge coupled device is driven by a clock drive pulse of $2f_{sc}$ so as to produce an output, which is converted to a digital color signal at a clock rate of $4f_{sc}$ by said digital interpolator.

8. A digital color camera comprising, means for generating first, second and third digital color signals, each at a rate of $4f_{sc}$ (where $f_{sc}$ represents the color subcarrier frequency) from outputs of imagers, means for forming a digital luminance signal from said first, second and third digital color signals, means for forming first and second digital color difference signals from said first, second and third digital color signals, prefilter means for limiting the band widths of said first and second digital color difference signals, means for generating a dot-sequential digital color difference signal where said first and second digital color difference signals appear every $1/4f_{sc}$ from said first and second digital color difference signals whose band widths are limited, and digital filter means receiving said dot-sequential digital color difference signal so as to limit the band widths of said first and second digital color difference signals.

9. A color digital camera comprising, means for generating first, second and third digital color signals each at a rate of to $4f_{sc}$ (where $f_{sc}$ represents the color subcarrier frequency) from outputs of imagers, means for forming a digital luminance signal from said first, second and third digital color signals, means for generating a dot-sequential digital color difference signal in which said first and second color difference signals appear alternately every $1/4f_{sc}$ from said first, second and third digital color difference signals, first digital filter means receiving said dot-sequential digital color difference signal so as to limit the band width of said first digital color difference signal, and second digital filter means with a narrower pass band than said first digital filter receiving said dot-sequential digital color difference signal which has had it band limited and limiting the band width of said second color difference signal.

10. A digital color camera for generating a digital TV signal comprising, means for generating first, second and third digital color signals at a rate of $4f_{sc}$, where $f_{sc}$ represents the color subcarrier frequency, first, second and third processor means receiving said first, second and third digital color signals, luminance signal forming means receiving the output of said first, second and third processor means, first and second prefilters which restricted pass bands receiving outputs of first and second processor means, a combining means receiving the outputs of said first and second prefilters and converting them into interlaced signal series at 2fs, a third prefilter receiving an output of said luminance signal forming means, a subtractor receiving the outputs of said first, second and third prefilters, a digital filter receiving the output of said subtractor and limiting the band width of its output signal, and means combining the output of said digital filter with said luminance signal.

11. A digital color camera for generating a digital TV signal with spatial offset imagers, comprising, means for generating first, second and third digital color signals at a rate of $4f_{sc}$, where $f_{sc}$ represents the color subcarrier frequency, first, second and third processor means receiving said first, second and third digital color signals, first, second and third interpolators receiving the outputs of said first, second and third processors, luminance signal forming means receiving the output of said first, second and third interpolators, a combining means receiving the outputs of said first and second interpolators and converting them into interlaced signal series at 2fs, a subtractor receiving the outputs of said luminance signal forming means and the output of said combining means, a low pass digital filter receiving the output of said subtractor and limiting the band width of its output signal, and means combining the output of said digital filter with said luminance signal.

12. A digital color camera for generating a digital TV signal comprising, means for generating first, second and third digital color signals at a rate of $4f_{sc}$, where $f_{sc}$ represents the color subcarrier frequency, first, second and third processor means receiving said first, second and third digital color signals, a matrix receiving the outputs of said first, second and third processors and forming a luminance signal, first and second prefilters with restricted pass bands receiving outputs of said matrix, first combining means receiving the outputs of said first and second prefilters and converting them into interlaced signal series at 2fs, a first digital filter receiving the output of said first combining means and limiting the band width of its output signal, a sample-hold circuit receiving the output of said first digital filter, a second digital filter receiving the output of said sample-hold circuit, and second combining means receiving the outputs of said first and second digital filters and the outputs of said first and second combining means connected together to form a color TV signal.

* * * * *